Aug. 7, 1945.     G. H. NITSCHMAN     2,381,179
BOTTLE DISPENSING MACHINE

Filed Feb. 25, 1942     4 Sheets-Sheet 1

INVENTOR.
BY George H. Nitschman
Word, Avey, Herrm & Evans
ATTORNEYS

Aug. 7, 1945.   G. H. NITSCHMAN   2,381,179
BOTTLE DISPENSING MACHINE
Filed Feb. 25, 1942   4 Sheets-Sheet 2

INVENTOR.
George H. Nitschman
BY
Wood, Arey, Herron & Evans
ATTORNEYS

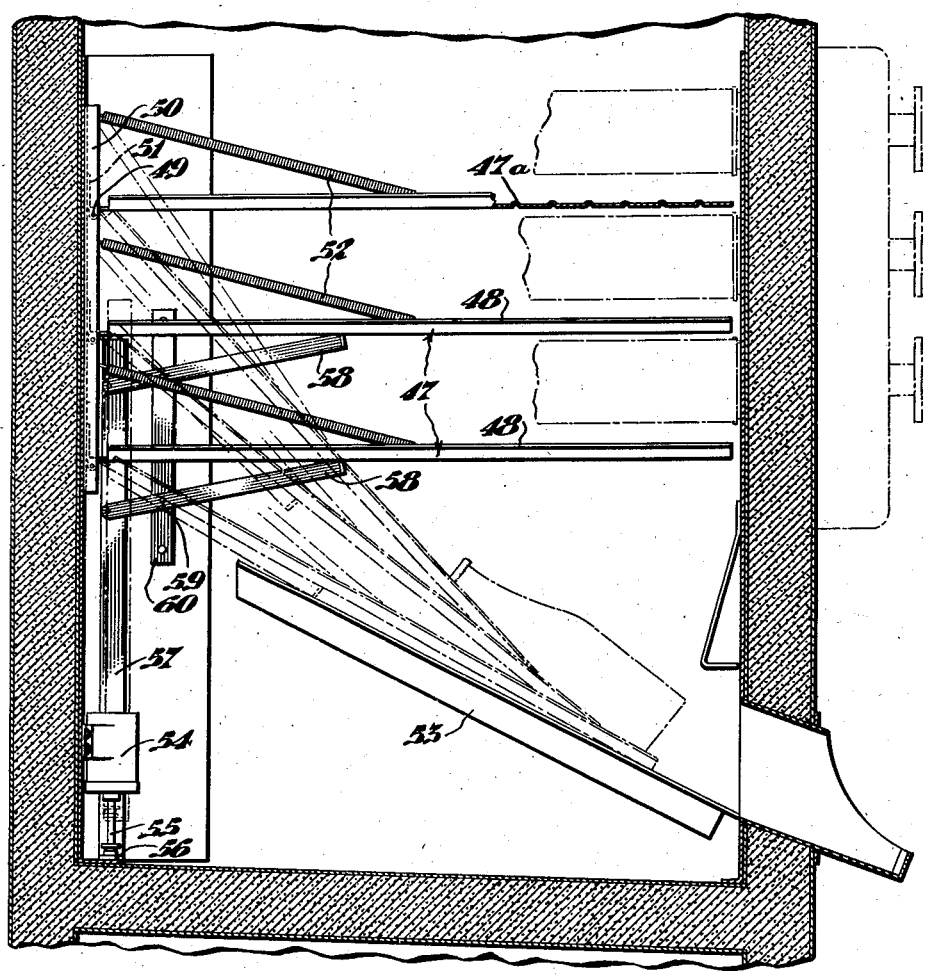

Aug. 7, 1945.   G. H. NITSCHMAN   2,381,179
BOTTLE DISPENSING MACHINE
Filed Feb. 25, 1942   4 Sheets-Sheet 4

INVENTOR.
George H. Nitschman
BY
Wood, Arey, Herron & Evans
ATTORNEYS

Patented Aug. 7, 1945

2,381,179

UNITED STATES PATENT OFFICE 2,381,179

BOTTLE DISPENSING MACHINE

George H. Nitschman, Lima, Ohio, assignor to The S. & S. Products Company, Lima, Ohio, a copartnership of Ohio Application February 25, 1942, Serial No. 432,170

12 Claims. (Cl. 194—93)

This invention relates to machines for dispensing bottled beverages and particularly to machines which deliver a bottle when a coin is inserted in the machine.

The present inventor realizes that a great many patents have been issued covering machines for dispensing bottles. Many of these machines will only dispense one brand of drink or handle bottles of uniform size. Where attempts have been made to provide a machine for dispensing drinks of different brands supplied in bottles of varying sizes, the machines have been very complicated and extremely expensive.

It has been the object of the present inventor to provide a coin controlled, bottle dispensing machine which will supply a number of different brands of drinks and which will, despite the variation in the size of the containers, handle the containers without difficulty and will, upon the presentation of a coin and appropriate manipulation, supply any selected brand.

It has been a further object of the present inventor to provide dispensing units in which the parts are standardized; that is to say, to provide a plurality of dispensing units, each one of which is adaptable, without change, for bottles in a wide range of sizes and shapes.

It is a characteristic of the present invention that the dispensing mechanism is made up of a number of identical units. Each unit is complete in and of itself and in operation each unit is utilized for a different beverage. With especially popular drinks, two units may be used for one flavor. This arrangement not only simplifies manufacture and assembly, but obviously cuts down on the cost of the machine. Then too, any number of these units may be installed in cabinets of appropriate size without changing the design of the dispensing elements.

Thus, it will be seen that the machine may be used with any and all brands of bottled beverages; that a number of different beverages can be handled by one machine; and, further, that the flavors of beverages handled can be changed at any time to suit local tastes and seasons.

It has been a still further object of the present inventor to provide a machine of this character which incorporates a locking means effective for each dispensing unit for automatically locking the unit against further operation when the supply of bottles is exhausted without in any way interfering with the operation of the other units.

A further object has been to provide means for delivering the bottles to the discharge point and further to provide a bottle selector and delivery means which is effective for jostling or agitating the bottles of the stack for preventing freezing together of the bottles.

Generally speaking, each unit comprises a pair of inclined shelves or racks for bottles; dispensing elements for removing the bottles from the racks one at a time; means for lowering the bottles from the dispensing elements to a discharge point; and operating means for actuating each dispensing unit individually. The operating means are normally locked and can be manipulated only when the lock mechanism is released by the insertion of a coin.

It has been a further object of the present inventor to provide a coin released locking mechanism which is common to all units of the dispensing mechanism and which can be adapted to any number of units without radical change.

It has been a still further object to provide a simple interlock between the units which permits only one of them to be operated at a time. A further object has been to include these two, the coin lock and interlock, as integral parts of the operating mechanism for actuating the dispensing units so that the locks and operating mechanism comprise a unit which takes up little space, is foolproof in operation, and is strongly constructed to give long and absolutely satisfactory service.

Other objects and advantages of the present invention will be pointed out in the following description of the drawings in which:

Figure 7 is a sectional view taken on line 7—7, Figure 1, illustrating the bottle let-down means.

Figure 11 is a fragmentary detail sectional view of a portion of Figure 8, showing a bottle dispenser being rotated to release a bottle, but the bottle being held back by the stop device.

Figure 12 is a view taken similarly to Figure 11, but showing the stop device released by further rotation of the cylinder and the bottle being dropped.

The mechanism of this invention is housed in a refrigerated cabinet which is cooled and insulated by conventional means. The racks or shelves for the bottles are disposed on a slight incline from the horizontal, one rack for each flavor, one above the other. The inclined racks extend crosswise of the machine; that is, from side wall to side wall, and are accessible for loading through a door at the front of the cabinet. The rotatable dispenser elements are located to the right at the lower ends of the respective racks and are journalled in the front and back walls of the cabinet. The bottles lie side by side in the racks and move by gravity, aided by weights, if desired, toward the dispensing elements.

Figure 1:
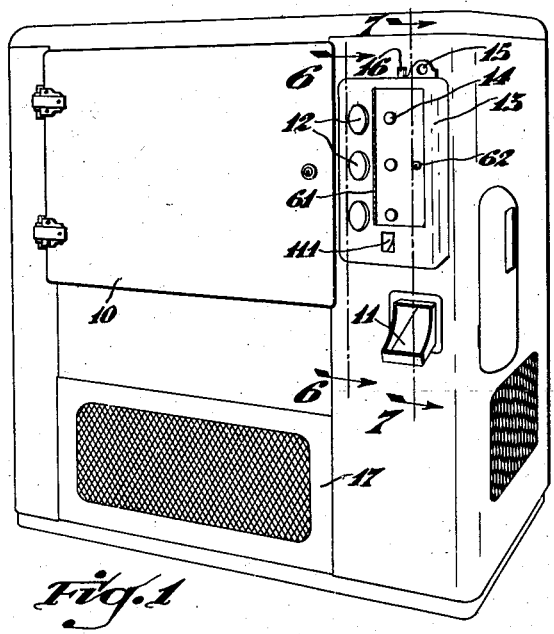
Figure 1 is a perspective view of a refrigerator cabinet containing the improved bottle dispensing mechanism of this invention.

Referring to the drawings, the cabinet is best shown in Figure 1. The bottles are loaded into the cabinet through the door 10 and are discharged at the chute 11. A plurality of knobs, one for each dispenser indicated at 12, is positioned at the right end of the cabinet in a vertical row on the face of a control box 13. In the present instance, a three flavor dispenser is shown. Opposite each knob, provision has been made to mount a bottle cap 14 to indicate the flavor dispensed by the respective knob.

On top of the control box 13 a coin slot 15 is provided and adjacent it is positioned a coin release plunger 16. The motor and other refrigerating mechanism may be housed in the lower part of the cabinet. This space also may be utilized as a storage space for an extra supply of bottles if desired. A door 17 is provided for this lower compartment.

*The dispensing mechanism*

Figure 9:
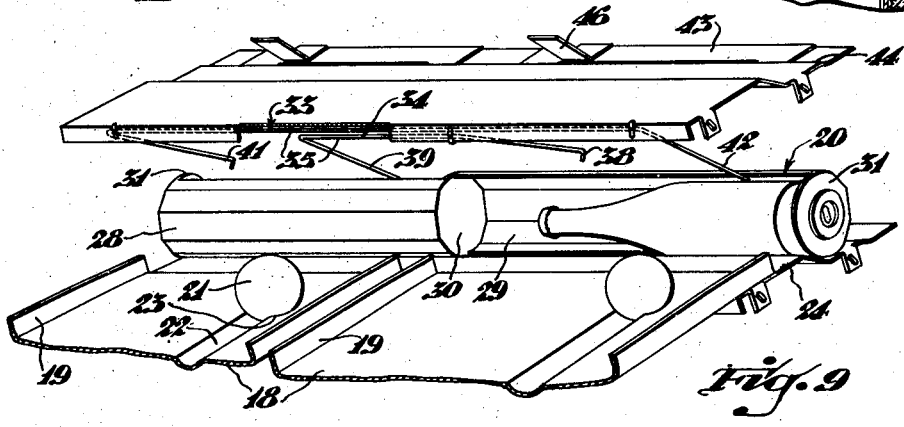
Figure 9 is a perspective view illustrating the bottle dispenser and the locking means effective for permitting dispensing of the last bottle in the particular shelf or rack.

The dispensing units are identical and therefore, the following description will be directed to only one of them. The bottle racks or shelves 18 are constituted by sheets of metal; the turned up front and back flanges 19 of the channels providing guides for the bottles. Two shelves are provided for each unit; that is, back and front, and these are positioned side by side in parallel relationship. The shelves may be made so as to be removable or they may be bolted or fastened by other means in the cabinet. The bottles rest on the shelves with the bottoms of the bottles disposed adjacent the forward edge of the shelves. As shown in Figure 9, the shelves are wider or deeper than the tallest soft drink bottle.

Figure 8:
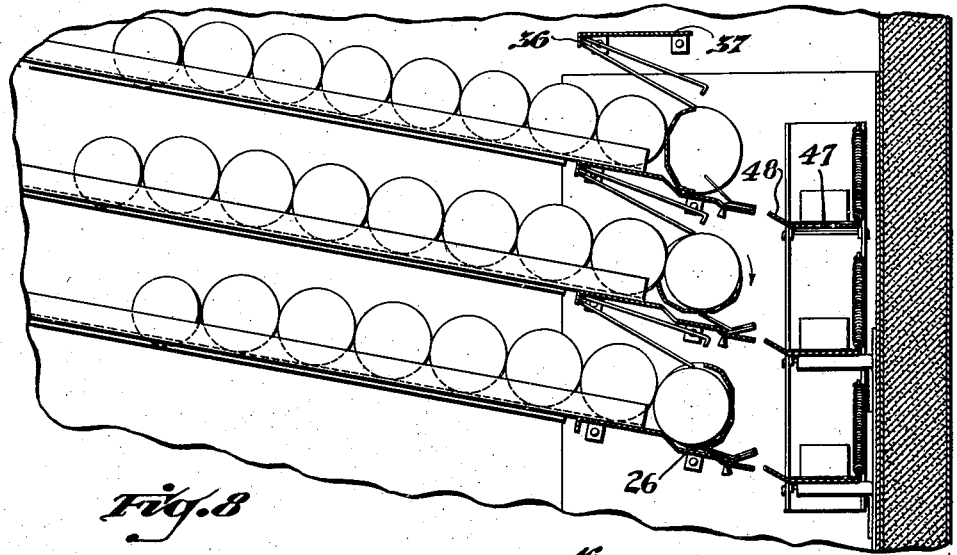
Figure 8 is a sectional view taken on line 8—8, Figure 6, illustrating the bottle racks or shelves and the locking mechanisms and showing the central dispensing means in operation at substantially the position illustrated in Figure 3.

Referring to Figure 8, the shelves are inclined, slanting down to the right toward the dispensing cylinders 20. The bottles feed by gravity toward the dispensing elements and are urged in their movement by heavy metal balls 21 which roll in longitudinal grooves 22 formed in the shelves. At the ends of the grooves 22, adjacent the dispensing cylinders, the balls are caught in holes 23 cut through the shelves. The holes are smaller in diameter than the balls and serve to stop the balls from rolling on into the dispensing cylinders when the last bottle on the shelf is dispensed.

In each instance, the lower ends of the two shelves rest on a cross support plate 24 which extends laterally of the machine and is fixed to the walls of the cabinet. The support means for the upper ends of the shelves are not shown. The support 24 just off the ends of the shelves drops down at an angle as at 25 and then continues in a slightly lower plane than that of the shelves. This provides a small ramp at 26 (Figure 11). A flange 27 at the upper end of the cross plate stiffens the plate.

The dispensing unit for the two shelves of each unit is made in two sections. It is constituted by a pair of half cylinders 28 and 29 which are joined axially, with the open faces of the half cylinders facing in diametrically opposite directions. A partition 30 is provided between the two half cylinders, and circular end pieces 31—31 are provided. The units 20 are journalled to rotate on stub shafts 32—32 extending axially from the respective ends of the units. These shafts will be discussed later.

The dispensing unit 20 extends across the support 24 at the ramp 26 (Figure 8). In normal position one of the half cylinder sections is open toward one of the shelves to receive a bottle; whereas, the back of the other half cylinder is turned toward its respective shelf. Generally speaking, in operation, the bottles are withdrawn from alternate shelves—first one and then the other until the supply is exhausted. This is accomplished by rotating the dispensing element clockwise as shown in Figure 8. One bottle is dispensed for every half revolution.

The half cylinders comprising the sections of the dispensing element are not round, but are configurated to provide three longitudinal flat portions as shown in Figures 11 and 12. This provision is made to keep the bottles from freezing to the shelves. The cylinders are of greater diameter than the largest bottle to be dispensed and thus, the bottle may move about laterally, and considerable jostling of the next bottle beyond the one being loaded into the cylinder takes place. It may be seen that the row of bottles resting against the back of one of the cylinders is agitated whenever the dispensing element is rotated due to the irregular contour of the element.

*Dispensing cylinders' locking mechanism*

Figure 10:
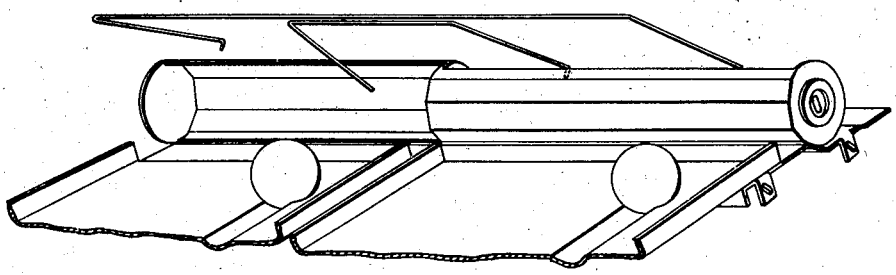
Figure 10 is a view taken similarly to Figure 9, but showing the locking means effective for blocking further rotation of the bottle dispensing means since it is empty.

The invention includes a simple lock mechanism for the dispensing element which is adapted to lock the cylinders against rotative movement whenever the supply of bottles in the unit is completely exhausted. The mechanism is shown in Figures 8, 9, and 10. It comprises a pair of U-shaped elements 33 and 34, which, in the preferred embodiment, are made of heavy wire. The arms of the two elements are formed at right angles to the base portions 35—35. One of the wire elements is considerably wider than the other; the wider one being indicated at 33; whereas, the narrower one is indicated at 34.

The wire elements are pivotally journalled at the base portions 35—35 and are positioned above the dispensing element with the arms extending longitudinally of the racks over the dispensing element. In the instances of the lowermost and intermediate dispenser units, the wire elements may be journalled on the flange 27 turned down from the edge of the cross plate 24; whereas, with the uppermost unit, they may be journalled on a flange 36 turned down from a support 37 extending across the machine in the same relative position as the plates 24. The lock wires are journalled so that they may swing freely.

As shown in Figures 9 and 10, the one arm of the narrower lock element 34 carries a hook 38; whereas, the other arm 39 has a plain end. The hooked arm 38 of the narrow element 34 is positioned above the rear end of the front cylinder 29. The hooked arm 38 extends out from the pivot point at an angle slightly above the arm having the plain end 39.

The wider lock element 33 also has the two types of arms. In this instance, the hooked arm, indicated at 41, is positioned above the rear portion of the rear cylinder 28; whereas the plain arm, indicated at 42, is positioned above the forward portion of the forward cylinder 29. As with the narrower lock element 34, the hooked arm 41 of the wider lock element 33 extends out from the pivot point at an angle above the plain arm 42.

In both instances, the plain end arms 39 and 42 are aligned for engagement with the large body portions of the bottles and the hooked ends 38 and 41 are aligned with the neck portions of the bottles.

It will be noted from Figure 8 that the half cylinders 28—29 are slightly less than exact halves and that the plain end arms 39—42 are slightly shorter than the hooked arms 38—41. The reason for this will be pointed out below.

The wire locks operate as follows; reference being made to Figures 8, 9, and 10. With the racks filled and the cylinders in the position shown in Figure 9, the plain end arm 42 rests on top of the bottle in the forward cylinder 29. This lifts the hooked arm 41 above the upper edge of the rearmost half cylinder. The other plain end arm 39 at this time is resting on the upper edge of the rearmost half cylinder so that the hooked arm 38 is above the forward cylinder. In the other position with a bottle in the rear cylinder, the plain end arm 39 rests on the bottle, raising hooked arm 38, and the plain end arm 42 rests on the forward cylinder raising the hooked arm 41.

These two conditions alternate as bottles are dispensed from the first one and then the other of the cylinders until the last bottle is dispensed. Up until this time both hooked arms are always raised either by having the plain end arms resting on a bottle or on the back of a cylinder.

Figures 9 and 10 respectively show the dispenser before and after the last bottle has been dispensed. In Figure 10 the dispenser has been turned one-half revolution from the position shown in Figure 9. With no bottle in the rear cylinder 28 plain end arm 39 of lock element 34 falls down into the open rear cylinder 28 and the hooked arm 38 comes down to rest on top of the forward cylinder 29. In this position the hook on arm 38 catches (Figure 10) the upper edge of the cylinder 29 and locks the whole unit against rotation. If the last bottle were dispensed from the rear cylinder 28 the other lock element 33 would operate since under these circumstances the plain end arm 42 would fall into the open cylinder 29 and hook 41 would lock against cylinder 28. Rotation of the cylinders in the counter-clockwise direction is prohibited by a ratchet mechanism discussed later.

A safety stop as a precautionary measure is also provided below each cylindrical section of the dispensing element. The stop is provided to hold the bottles in the cylinders until the cylinders are turned all of the way through one-half revolution. Otherwise, it might be possible, under unusual circumstances, to discharge the bottle from the cylinder without completing a full cycle of one-half revolution. As will be apparent later, this condition would cause the interlock mechanism (described on pages 4 and 5) to prevent operation of the other dispensing devices.

The safety stop is shown in Figures 9, 11, and 12. One is provided for each cylinder of the pair comprising the dispensing unit. Each one is constituted by a flat bar 43 which lies along an extension of the support 24 on the dispensing side of the cylinders. The support may be stepped as at 44 to seat the bar. The bar is provided with hinge tangs 45—45 along its rear edge. The tangs are bent downwardly through slots in the support 24 at the step 44 and are twisted to hold the bar in hinged position. This permits upward swinging movement of the bar 43.

A strip is attached to the bar and is bent upwardly at an angle to provide a finger 46 disposed in the path of the half cylinder which it serves. When the half cylinder is open toward the racks, the finger 46 is engaged for raising the bar. When the cylinder is rotated to dispense a bottle, the finger being under the cylinder (Figure 11) keeps the bar up and in the path of the bottle until the half cylinder completes the half revolution, at which time the lower edge of the half cylinder clears the end of the finger 46, permitting the bar to fall out of the path of the bottle (Figure 12).

When the bottle rolls free; that is, when the safety stop is released, the bottle will roll down the lower end of the shelf or ramp before it drops off onto its particular chute arm, which arms are described immediately hereinafter.

Bottle let-down device

The bottles are lowered from the dispensing elements and guided to the discharge chute by a let-down device shown in Figure 7.

The let-down device comprises three spring supported chute arms 47 which are disposed normally horizontally across the end of the cabinet and swing down under the weight of a bottle to carry it to the discharge chute. An arm is provided for each dispensing element; being positioned just beyond the end of the respective support 24 (Figure 8) in order that dispensed bottles may roll from the half-cylinders onto the let-down device.

Each arm is formed from a strip of sheet metal and has a lip 48 turned up at an angle from the edge adjacent the ramp 26. The lip 48 serves as a continuation of the ramp 26 to cause the bottles to roll well onto the arm and stay on while being let down. The arm, although not touching the end wall of the cabinet, is near enough to it so that the bottles cannot fall off the wall side of the arm. The arm is pivoted at the end adjacent the rear wall of the cabinet. All three arms are pivoted on pins 49 which extend between the walls of a vertically disposed channel piece 50 which is fixed to the rear wall of the cabinet. At the rear end of each arm a flange 51 is bent upwardly at right angles to abut the base of the channel piece 50 when the arms are in the horizontal position.

Each of the chute arms 47 are provided with cross ribs 47a (Figure 7) which tend to lessen the area of contact between the bottle and the chute arm and thus, reduce the friction and the possibility that the bottle might stick on the chute arm. These ribs are formed by stamping corrugations in the chute arms.

The springs mentioned above are indicated at 52. They are fixed to the back edges at the central points of the respective arms at one end and to the one wall of the channel 50 at the other end. The springs support the arms, serve as slight counterbalances for the bottles and return the arms to the horizontal positions after a dispensing operation.

When a bottle is dispensed onto the uppermost arms, the arm swings down pushing the two arms beneath it down into the position shown in dot-dash lines in Figure 7. A stop 53 provided on the end wall of the cabinet limits the downward movement. This stop is constituted by an angle that is fixed to the wall on approximately the same slant as that assumed by the lowermost arm when it is down. The angle 53 also serves as a slide for bottles as they come off the arms, the lower end of the angle terminating at the discharge chute 11. The discharge chute 11 may be a conventional type and a door may be provided at the discharge opening.

Naturally, as a bottle is lowered by the arms, it picks up momentum. In order to keep the arms from slamming into the angle stop 53, the inventor has provided a simple cushion device.

The essential part of the cushion device is an air cylinder 54. The air cylinder is fixed on the rear wall of the cabinet near the lower end thereof beneath the pivot points for the arms. It is a standard anti-slam air cushion cylinder having a bleeder hole and a cup piston which permits the plunger, indicated at 55, to be pushed in slowly without resistance but which resists sudden movement. The details of the cylinder are not shown because the cylinder is a well-known structure and may be purchased on the open market.

The air cylinder is positioned with the plunger 55 extending downwardly. The plunger rests on a foot 56 which, in turn, rests on the floor of the cabinet. The foot extends at right angles from a vertically disposed bar 57 that depends from a pair of pivoted parallel levers 58—58. The bar 57 is pivotally journalled on the ends of the levers 58, whereas the other ends of the levers are respectively in contact with the under side of the two lower let-down arms 47. The fulcrums of the two levers are constituted by pins 59—59 which are fixed in a bar 60 secured to the end wall of the cabinet. With this arrangement, as the arms are pushed down the bar 57 is raised, forcing the plunger 55 into the cylinder. In practice, the air cylinder 54 is adjusted so that the arms swing down to within a few inches of the stop member at which time the speed that they have gathered in their downward movement causes sudden compression of the air in the air cylinder and slowing of the piston. The last few inches of movement is therefore controlled by the air escaping from the bleeder hole in the air cylinder.

*Coin controlled operating mechanism*

The dispensing elements are operated by the knobs 12; a bottle being dispensed every half revolution. Normally the knobs are locked against rotation, but upon the insertion of a coin, the knobs are freed; at which time one of them may be manipulated. All of the operating mechanism has been included in the single control box 13. The box may be opened at the front; the door being hinged at 61 and provided with a lock at 62.

Figure 2:
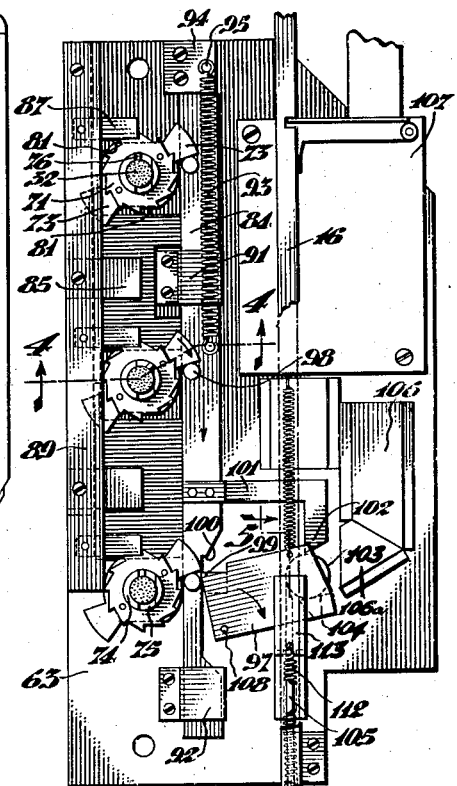
Figure 2 is a front view of the coin controlled mechanism for selectively releasing the bottles, showing the center bottle selector means being operated to release a bottle, the view being fragmentary and the cover removed for better illustration of the mechanism.
Figure 3:
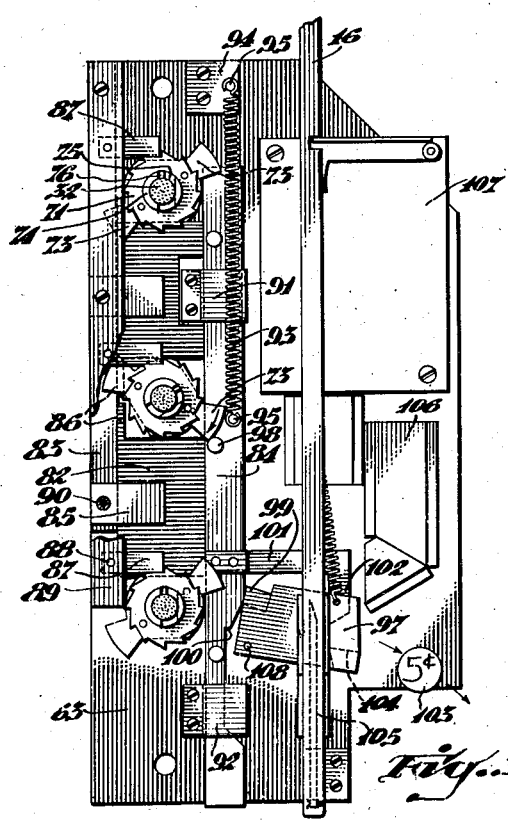
Figure 3 is a view taken similarly to Figure 2, but showing the center bottle selector means fully released and the coin being dropped in the direction of the coin box as the bottle selector means is further rotated to release the bottle.
Figure 4:
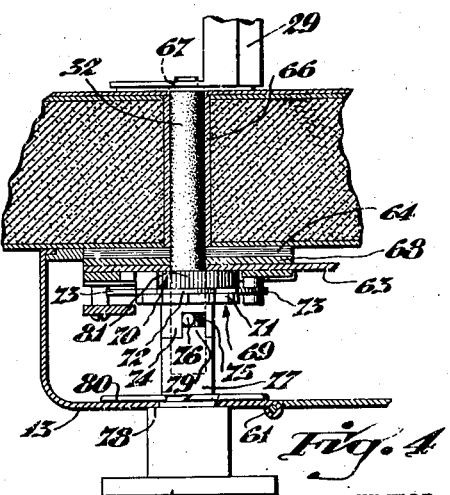
Figure 4 is a fragmentary sectional view taken on line 4—4, Figure 2, illustrating the details of a bottle selecting means.
Figure 6:
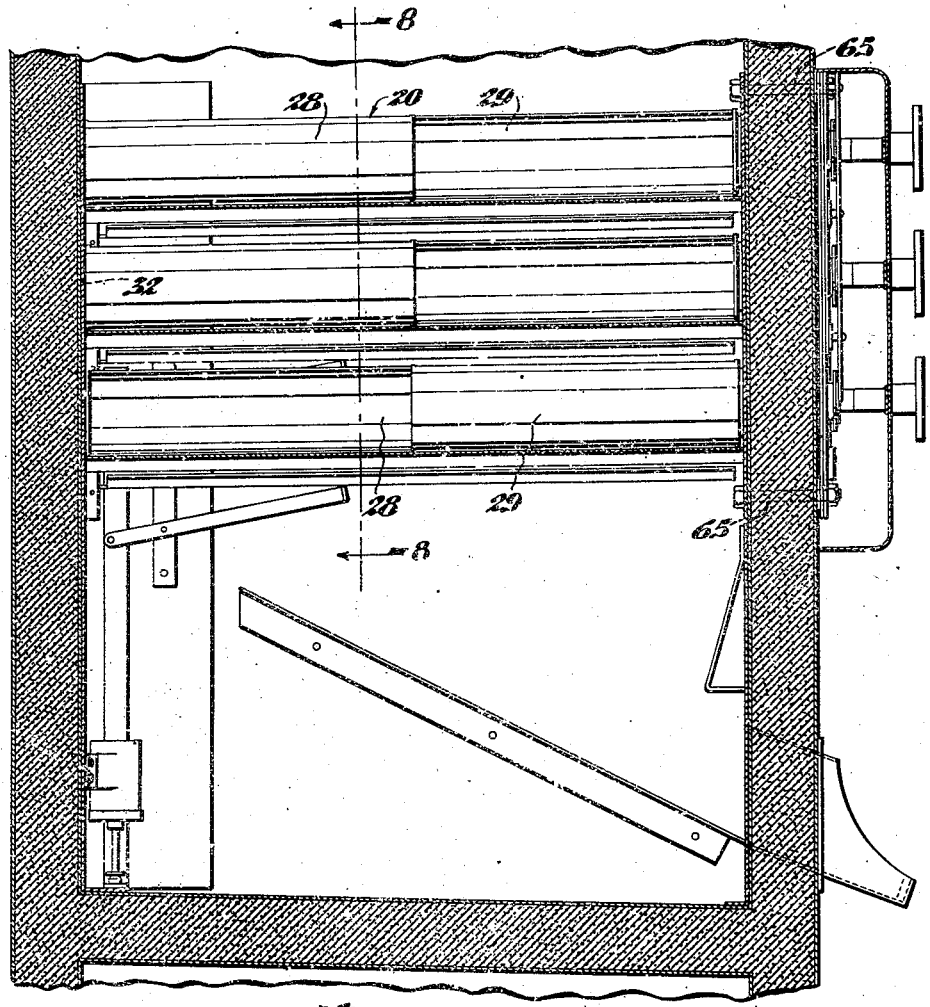
Figure 6 is a sectional view taken on line 6—6, Figure 1, illustrating the bottle discharge means at the base of the respective delivery racks or inclined shelves.
Figure 5:
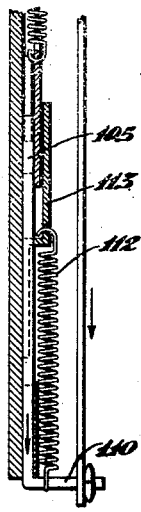
Figure 5 is a fragmentary sectional view taken on line 5—5, Figure 2 illustrating the details of the coin release.

Referring to Figures 2, 3 and 4, the operating mechanism is mounted on the face of a plate 63. The plate is spaced from the front of the cabinet by fiber spacer plates 64 at the top and bottom. The plate 63 is bolted into place by a pair of fiber bolts 65—65 which extend through spacers 64 and the insulated walls of the cabinet (Figure 6). The fiber bolts and spacer plates are utilized so that there is no chance of the plate 63 chilling and thus causing condensation and resultant moisture.

The stub shafts 32—32 on which the dispenser elements rotate are journalled in the walls of the cabinet. The shaft at the rear end of each dispenser unit is fixed to the front circular end piece 31 of the dispenser unit and is just long enough to be journalled appropriately (not shown). The shaft at the front end of the dispenser unit is made of fiber. The fiber shaft is journalled in a bushing 66 in the front wall of the cabinet and, at the one end, is keyed in a slot 67 in the center of the forward end piece 31 of the dispenser unit. The other end of the fiber shaft extends through an aperture in the plate 63 and into the control box 13. A stiffener strip 68 may be utilized to back the plate 63 in this area.

Just in front of the plate 63, a cam and ratchet unit, indicated generally at 69, is journalled on the fiber shaft. The unit 69 includes three parts which are pinned together: an interlock cam 70 at the rear; a ratchet wheel 71 at the front; and a disc 72, positioned between the cam and ratchet, which has a pair of oppositely disposed arms 73—73 extending radially therefrom. A hub 74, as a part of the ratchet 71, extends from the front of the unit.

The fiber shaft is continued beyond the end of the hub 74 and terminates just short of the front wall of the control box 13 (Figure 4). The forward end of the hub 74 is notched as at 75 and a key pin 76 which is fixed in the fiber shaft is engaged therein. Referring to Figures 3 and 4, it will be noted that the pin extends from one side of the shaft only, and that the notch is relatively wide and cut into the sleeve to one side thereof. This will be discussed below.

The knobs (Figure 4) include a hub portion 77, of the same diameter as the hub 74, that provides a shoulder 78 where it joins the head of the knob. The hub portion 77 is journalled in a hole cut through the front of the control box in line with the fiber shaft. In this position the shoulder 78 rests against the face of the box and the hub portion 77 extends into the box. The inner end of the hub 77 is bored to slip over the forward end of the fiber shaft and is cut as at 79 to provide a pair of lugs for engagement with the notched end of the hub 74. The lugs do not extend all of the way into the notches thus providing room for the key pin 76. The knob is held in place by a cotter key 80 engaged in a groove around the hub portion 77 just on the inside of the front wall of the box 13.

It will be noted that the knob is not keyed directly to the fiber shaft, but is linked to it through the sleeve 74 and the pin 76.

The interlock cams 70 of the units 69 for the three unit dispensing machine shown in the drawings, are adapted to permit only one dispenser to be operated at a time. Each cam interlock comprises a circular disc member that has diametrically opposite sides flattened as at 81—81. In normal position, these flat sides are at the top and bottom of the disc respectively. Between adjacent units a lock-plate 82 is provided. The lock-plate lies against the wall 63 and is slidably mounted thereon between two strips 83—84 which abut the side edges of the lock-plate. The strip 83 extends vertically and is fastened to the face of the wall while vertical strip 84 is slidable and comprises a lock bar to be described later in the specification. The lock-plate is held against the wall 63 by a finger 85 bolted to the strip 83 and extending partially across the face of the lock-plate. The machine shown is provided with two such lock-plates since three dispenser units are included.

In normal position the plate between the upper two units rests on the upper flat side 81 of the cam 70 of the middle unit. In this position, the top edge of the upper plate is spaced from the upper cam a distance just sufficient to permit the arcuate portions of the cam to clear it. In this position, the upper cam is free of the interlock and may be rotated. At this time, if the middle cam were rotated, the plate would be pushed up against the flat 81 on the cam, thus, locking the top unit against rotation, but freeing the middle unit. The plate between the middle unit and the lower unit operates in the same manner.

In order to interlock the top and the middle units, the two plates have fingers 86—86 at one side thereof which meet at one side of the middle unit. Therefore, when the lower unit is revolved, the lower plate is moved up to lock the middle unit and the upper plate is pushed up by the finger 86 to lock the top unit.

As mentioned on page 3, these locking plates are effective for permitting operation of only one unit at a time whenever any one of the units is partially rotated; that is at a position somewhere midway of its normal half revolution. Note, for example, the position of the intermediate unit shown in Figure 3. The safety stop will prevent release of the bottle until a full half revolution is completed.

The ratchet 71 comprises a notched wheel engaged by a finger 87. The ratchet is provided in order that the dispenser unit be rotatable in one direction only. The fingers for all three units are pivotally mounted on pins 88 fixed to a strip 89. The strip extends vertically and is disposed to one side of the three ratchets. The strip 89 may be spaced outwardly from the face of the strip 83 by spacers 90 and the fingers pivoted on the rear side thereof for protection. The finger is positioned to engage the top of the ratchet wheel. In this way, the free end of the finger maintains engagement with the ratchet wheel by gravity.

The coin lock mechanism for the dispensing machine includes the lock bar 84 which is common to all three dispenser units. In general, the lock bar is movable to free the dispenser units for rotation, only when a coin has been inserted in the machine.

The lock bar 84 is slidably mounted on the face of the plate 63 in a vertical position to one side of the cam and ratchet units. In the instance shown, the one side of the lock bar abuts the adjacent edges of the interlock plates 82—82 and serves as one of the above-mentioned guides 83—84 for the plates on this one side. At the upper and lower ends of the lock bar 84, slide ways 91 and 92 are provided to hold the bar in place. The bar is constantly urged upwardly by a fairly strong spring 93, against an abutment block 94 fixed to the plate 63. The spring may be mounted between pins 95—95 fixed in the block 94 and bar 84 respectively.

Normally, the lock bar 84 is locked against downward movement by means of a coin controlled locking member 97. The lock bar 84 includes pins 98, one for each dispensing means. These pins project from the front face of the lock bar and are interposed in the path of movement of the arms 73—73. Thus, in order to move any one of the dispensing elements through a half revolution for dispensing a bottle, the appropriate arm must displace its particular pin 98. The latch member 97 will prevent such displacement unless a coin has been inserted, by virtue of the fact that its locking point 99 will engage a shoulder 100 provided on the right hand side edge of the lock bar. Thus, it is necessary that the locking member be displaced coincidental to the down travel of the lock bar.

For this purpose, the lock bar carries an arm 101 projecting laterally to the right above the locking member and including a downward extension 102 adapted to engage the top of the inserted coin 103 which will rest upon a ledge 104 of the locking member. The coin 103 is retained in this position by means of a displaceable pin 105 disposed for vertical movement. As shown in Figure 2, the coin is in the described position, having been delivered to this point through a chute 106 below the coin receiving and checking unit 107.

The coin receiving and checking unit is of standard construction. If the coin is a proper one, it will drop through this box into the chute 106 and will be diverted at an angle through extension 106a into position on the ledge 104 of the locking member. In this position, it will form an intervening contact means between the arm 102 and the ledge and will thus cause the locking member to rotate on its pivot 108 displacing the point 99 from the path of movement of the lock bar (Figure 3). When the locking member has moved downwardly as shown, the coin will roll off the ledge 104 to the right and will drop into the coin box.

The point of the downward extension 102 engages just to the rear of the vertical center line of the nickel and tends to wedge or squeeze the nickel off the ledge 104, thus aiding in the proper discharge of the nickel from the locking member.

As will be apparent in Figure 3, a central dispensing means has been operated and its arm is just about to pass a particular pin 98, whereupon the spring 93 will return the lock bar to normal position of abutment with the plate 94. Rotation of the arm may continue until the other arm is brought around to its initial position, whereupon further revolution is blocked by the pin 98 which has been retracted to its normal position (Figure 2).

A certain amount of clearance for operation of the lock bar must be provided and this is afforded by the arrangement of the notch 75. When there is no coin in the locking member, the operator may turn any one of the dispensing members until the point 99 engages the shoulder 100. Movement cannot continue beyond this point. This clearance between the point 99 and the shoulder 100 is necessary in order that the point may clear the shoulder when the locking member is swung by normal coin interposed operation thereof. After a patron has moved the lock bar without presenting a coin, the lock bar must be returned to its upper position to maintain the clearance between the point 99 and the shoulder 100, despite a slight starting movement of the dispensing units. Thus, the cam and ratchet unit will be moved back, the back movement being permitted by virtue of the slot 75 as indicated at the central dispensing member in Figure 2.

In the event that the machine is empty or should the patron want a coin returned, he can accomplish this by depressing the plunger 16. This plunger is attached at its lower end to a forward extension 110 of the displaceable finger 105 and thus, will be effective for lowering this finger and permitting the coin to roll off the ledge to the left and thereby drop through the coin return 111 (Figure 1). The finger 105 is returned to normal position by means of a coil spring 112 under tension between the angular extension 110 of the finger and a fixed bracket 113. This fixed bracket holds the locking member in position relative to the main support plate 63.

Thus, it is possible for the patron to select any one of three flavors. After dropping a coin, he may manipulate a particular knob 12 turning the same to the right through a half revolution, whereupon the bottle will drop down into the delivery chute 11 where it can be picked up.

Having described my invention, I claim:

1. A refrigerator for bottled goods, said refrigerator including inclined bottle shelves arranged one above the other and in pairs respectively, front and back, a rotatably mounted dispensing tube extending across the lower end of each pair of shelves and providing oppositely facing cup-shaped receptacles for the front and back shelves respectively, independent means for rotating each of said tubes, whereby the bottles are received in the tube alternately from the front and back shelves of the respective pairs of shelves, pivotally mounted stop devices located at the discharge ends of the respective shelves beyond the dispensing tubes to engage bottles released from said tubes, said stop devices having means for moving the stop devices to bottle stopping position upon partial rotation of said dispensing tubes and releasing said stop devices for discharge of bottles therefrom upon completion of rotation of said dispensing tubes, let-down units for the bottles, comprising pivoted arms disposed just off the ends of the shelves, each of said arms being spring-actuated to normal horizontal position, slowing devices connected to the arms for slowing up their lowering movement as they move downwardly under the weight of a bottle, and delivery means receiving each bottle for conveniently disposing it for removal by the patron.

2. A refrigerator for bottled goods, said refrigerator including inclined bottle shelves arranged one above the other, a rotatably mounted dispensing tube extending against the lower end of each shelf and having a semi-cylindrical cup receiving chamber, independent means for rotating each of said tubes to deliver a bottle each time a tube is rotated, movable stop devices located at the discharge ends of the respective shelves beyond the dispensing tubes to engage bottles released from said tubes, said stop devices having means for moving the stop devices to bottle stopping position upon partial rotation of said dispensing tubes and releasing said stop devices for discharge of bottles therefrom upon completion of rotation of said dispensing tubes, a let-down unit for the bottles, comprising a pivoted arm disposed just off the end of each shelf, each of said arms being spring-actuated to normal horizontal position, a slowing device connected to the arms for slowing up their lowering movement as they move downwardly under the weight of a bottle, and delivery means receiving each bottle for conveniently disposing it for removal by the patron.

3. A refrigerator for bottled goods, said refrigerator providing inclined shelves disposed in the same plane, front and back respectively, a rotatable cylinder disposed at the lower end of the shelves and providing oppositely facing cup portions for the respective shelves, means for rotating said cylindrical element through a half revolution for dispensing the bottles alternately from the respective shelves, pivotal means controlled by said cylinder for retaining the bottle being dispensed at the end of the shelf beyond the cylindrical element until a full half revolution of the cylindrical element has been performed, a horizontally disposed pivoted support means receiving the bottle, said horizontally disposed means being spring supported against unduly sudden lowering movement under the weight of the bottle, and means for catching the bottle as it slides off the support means when the support means is lowered to an inclined position on its pivot.

4. A refrigerator for bottled goods, said refrigerator providing inclined shelves disposed in the same plane, front and back repectively, a rotatable cylinder disposed at the lower end of the shelves and providing oppositely facing cup portions for the respective shelves, means for rotating said cylindrical element through a half revolution for dispensing the bottles alternately from the respective shelves, pivotal means controlled by said cylinder for retaining the bottle being dispensed at the end of the shelf beyond the cylindrical element until a full half revolution of the cylindrical element has been performed, and means for receiving the bottle as it is discharged from the retaining means.

5. In a refrigerating cabinet for dispensing bottled goods, said cabinet providing an inclined shelf, a rotatable cylinder providing a cup-shaped receptacle adapted to receive bottles progressively at the lower end of the shelf, a stop means normally in stopping position below the cup-shaped receptacle, said stop means including an arm engaging the cup-shaped receptacle until the cup-shaped receptacle faces entirely toward the discharge end of the shelf, and thereupon releases the stop means, a let-down supporting means pivotally mounted at one end adapted to receive the bottle for lowering movement permitting the bottle to slide therefrom, and means for catching the bottle.

6. A refrigerating cabinet for dispensing bottled goods, said cabinet providing an inclined shelf, a rotatable cylinder providing a semi-cylindrical receptacle adapted to receive bottles progressively at the lower end of the shelf, stop means normally in stopping position below the receptacle, said stop means including an arm engaging the receptacle until the receptacle is rotated through 180 degrees and the horizontal edge of the receptacle clears the arm, and thereupon releases the stop means, and means for catching the bottle.

7. In a refrigerating cabinet for dispensing bottles, an inclined shelf, a cylindrical element presenting a cup-shaped receptacle for receiving and delivering the bottles separately from the end of the shelf, means for rotating the cup-shaped element, a locking means normally supported on the element or bottle and adapted to move into position, catching on the longitudinal edge of and holding the cylindrical element in position against further rotation when there is no bottle in the receptacle, and means for receiving and delivering the bottles.

8. A refrigerator for dispensing bottled goods, comprising front and back inclined shelves disposed in the same plane, a rotatably mounted cylinder disposed across the lower ends of the shelves including oppositely facing semi-cylindrical receptacles for the respective shelves, means for lowering and delivering the bottles as they are released from the end of the shelf by rotation of said cylinder, and latching means for stopping rotation of the cylindrical element, said latching means comprising U-shaped latches having their base or cross portions pivotally supported above the cylinder, each including a plain side arm adapted to be supported either on the cylinder or contained bottle and its other end including a hooked arm normally held clear of the cylinder when the plain arm engages either the bottle or the cylinder, but adapted to drop into position for engaging the respective longitudinal edge of the cylinder when there is no bottle in the cylinder adjacent the particular plain arm.

9. Means for controlling rotation of a plurality of cylindrical elements comprising a common lock bar vertically disposed along the front of the machine alongside the respective axes of rotation of the cylindrical elements, means for preventing back rotation of the elements, pins on the lock bar, one for each cylindrical element, rotatable means for rotating said cylindrical elements a radial arm carried by the rotatable means for each element adapted to engage the respective pins and thereby move said lock bar, spring means normally maintaining the lock bar in retracted position, a pivoted latching member engaging the lock bar for preventing cylindrical element rotating movement, a coin delivery means, and supporting means on the latching member for receiving the coin, said lock bar including means for engaging a coin supported by said supporting means whereby said coin is interposed between said latching member and lock bar and becomes effective for rotating the latching member out of locking engagement with the lock bar and for tipping the latching member to drop the coin when it has performed its function of unlatching the lock bar upon movement of said lock bar.

10. In a refrigerating cabinet, means for supporting a stack of bottles or the like, means for releasing one of the bottles of the stack at a time, a pivoted arm adapted to receive the bottle at horizontal position, said arm being supported by yieldable means permitting slow downward movement of the arm, and said arm including cross corrugations for reducing the area of contact between the bottle and the arm.

11. Means for controlling the operation of article releasing devices comprising a common latch element interposed in the path of movement of said release devices, and another latch element cooperating with the first and normally adapted to hold the first in movement restricting position, means for delivering a coin to a position between said latch elements, the second-named latch element adapted to be moved clear of the first latch element when the first latch element is moved and engages the coin and the coin actuates the second latch element, whereupon any one of the release devices may be moved to release position.

12. In a refrigerator for dispensing bottled goods or the like, a series of devices for releasing bottles, a common latching means for preventing operation of any one of said releasing devices, said latching means including a movable lock bar element interposed in the path of movement of said devices and normally held in this position, and said latching means additionally comprising a latch member pivoted for movement into latching and unlatching relationship with said lock bar, means for delivering a coin between said lock bar and said latching member to form therebetween a connection effecting unlatching of said lock bar when the lock bar is moved, and means for moving said lock bar upon movement of said releasing devices.

GEORGE H. NITSCHMAN.